United States Patent
Li et al.

(10) Patent No.: US 9,261,075 B2
(45) Date of Patent: Feb. 16, 2016

(54) WIND TURBINE SHADOW FLICKER PROTECTION SYSTEM HAVING A DRIVING MECHANISM ALLOWING A SINGLE LIGHT SENSOR TO RECEIVE LIGHT AT DIFFERENT TIMES AND DIRECTIONS

(71) Applicant: General Electric Company, Schenectady, NY (US)

(72) Inventors: Rong Li, Shanghai (CN); Shijiang Liu, Shanghai (CN); Chenggang Huang, Shanghai (CN); Weiguo Zhang, Shanghai (CN); Qi Zhang, Shanghai (CN); Stefan Rieken, Markstrasse (DE)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 14/259,220

(22) Filed: Apr. 23, 2014

(65) Prior Publication Data

US 2015/0308406 A1  Oct. 29, 2015

(51) Int. Cl.
*G01J 1/42* (2006.01)
*F03D 7/00* (2006.01)
*G01J 1/04* (2006.01)

(52) U.S. Cl.
CPC .............. *F03D 7/00* (2013.01); *G01J 1/0403* (2013.01); *G01J 1/0407* (2013.01); *G01J 1/42* (2013.01)

(58) Field of Classification Search
CPC ............. G01J 1/42; G01J 1/0407; F03D 7/00; H05B 33/0845; G01P 13/025
USPC .................. 250/203.4, 214.1, 239, 205, 221; 416/27, 30; 290/44; 126/600
See application file for complete search history.

(56) References Cited

U.S. PATENT DOCUMENTS 6,005,236 A * 12/1999 Phelan ........................ F24J 2/38
126/600
7,619,321 B2  11/2009 Wobben
7,777,362 B2   8/2010 Wobben
7,812,471 B2  10/2010 Wobben

FOREIGN PATENT DOCUMENTS

DE  19928048 A1  12/1999
EP   2554840 A1   2/2013
JP  2004360508 A  12/2004

OTHER PUBLICATIONS

European Search Report and Written Opinion issued in connection with corresponding EP Application No. 15164631.2-1607 dated Aug. 31, 2015.

* cited by examiner

*Primary Examiner* — Que T Le
(74) *Attorney, Agent, or Firm* — Global Patent Operation; Douglas D. Zhang

(57) ABSTRACT

A light intensity detection system for a wind turbine including a single light sensor adapted to measure the intensity of light, a housing for protecting the single light sensor from environmental influences, and a driving mechanism configured to allow the single light sensor to receive light from a first direction at a first time and from a second direction at a second time.

20 Claims, 7 Drawing Sheets

WIND TURBINE SHADOW FLICKER PROTECTION SYSTEM HAVING A DRIVING MECHANISM ALLOWING A SINGLE LIGHT SENSOR TO RECEIVE LIGHT AT DIFFERENT TIMES AND DIRECTIONS

BACKGROUND OF THE INVENTION

The subject matter described herein relates generally to methods and systems for wind turbines, and more particularly, to methods and systems concerning a shadow flicker protection system of a wind turbine.

Wind energy harvested, for example, through the use of large scale wind turbines has experienced rapid growth in recent years. Sources of this growth may be the numerous environmental, technical and economic benefits related to wind generated energy production. Wind energy is widely available, renewable and reduces the production of greenhouse gases by diminishing the need of fossil fuels as energy source. Furthermore, technical developments have improved design, manufacturing technologies, materials and power electronic devices of wind turbines and will in the future continue to decrease production costs of wind turbines while increasing their energy production capabilities and efficiencies.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

Wind turbines may be placed individually or in groups, also known as wind farms, in on- or off-shore environments. When the wind turbine is placed in the proximity of a residential area, it is possible when the sun is unfavorable positions, that the wind turbine or rotor thereof is between the sun and a residence of the residential area. If the sunshine is not affected by dark clouds, the rotating rotor constantly throws a shadow on to the residence or property thereof. The shadow casting, also known as shadow flicker, caused by a wind turbine on the adjoining properties is often perceived by the residents as being very troublesome and may spook animals, such as animals grazing in the proximity of a wind turbine.

A number of factors such as the position and point of the sun and cloudiness may influence the shadow flicker behavior of wind turbines. In the northern hemisphere, the risk for shadow flickering is largest in spring, autumn and winter as well as sunrise and sunset. Therefore, even if the wind turbine satisfies the legal approval requirements, there is however not always any guarantee that the undesired shadow casting effect is prevented.

The effect of shadow flicker may be resolved by the use of wind turbine shut-down systems that use a plurality of expensive light sensitive sensors typically positioned in different locations to determine the shadow casting behavior of a wind turbine. In particular, the multiple light sensors are used to determine light intensity at different regions, i.e., in a shadowed region and in a light region with direct light incidence (direct sun irradiation). Such shut-down systems often have a complex set-up and wiring. Each light sensitive sensor is prone to failure. If one of the light sensors fails, the shut-down system fails. This causes such shut-down systems to be unnecessarily un-reliable, expensive and to have a high cost of ownership.

Hence, it will be appreciated that a more cost efficient, reliable and simpler shut-down system is desired. The subject matter described herein pertains to such a system and method of use thereof, amongst other things, by improving the reliability of such shut-down systems.

BRIEF DESCRIPTION OF THE INVENTION

In one aspect, a light intensity detection system for a wind turbine is provided. The light intensity detection system includes: a single light sensor adapted to measure the intensity of light; a housing for protecting the single light sensor from environmental influences; and a driving mechanism configured to allow the single light sensor to receive light from a first direction at a first time and from a second direction at a second time.

In another aspect, a wind turbine is provided. The wind turbine includes: a nacelle supported by a tower; at least one rotor blade to capture wind energy; and a light intensity detection system. The light intensity detection system includes: a single light sensor adapted to measure the intensity of light; a housing for protecting the single light sensor from environmental influences; a driving mechanism configured to allow the single light sensor to receive light from a first direction at a first time and from a second direction at a second time, respectively; and a control system for operating the wind turbine, wherein the control system is operatively connected with the light intensity detection system.

In yet another aspect, a method for operation of a wind turbine is provided. The wind turbine includes a light intensity detection system including a single light sensor. The method includes: measuring with the single light sensor a first intensity of light from a first direction at a first time; measuring with the single light sensor a second intensity of light from a second direction at a second time; and changing the operational state of the wind turbine based on the obtained measurements when a predetermined light intensity condition is exceeded.

The disclosure is also directed to a controller for carrying out the disclosed methods and including apparatus parts for performing each described method steps. These method steps may be performed by way of hardware components, a computer programmed by appropriate software, by any combination of the two or in any other manner. Furthermore, the disclosure is also directed to methods by which the described apparatus operates. It includes method steps for carrying out every function of the apparatus.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
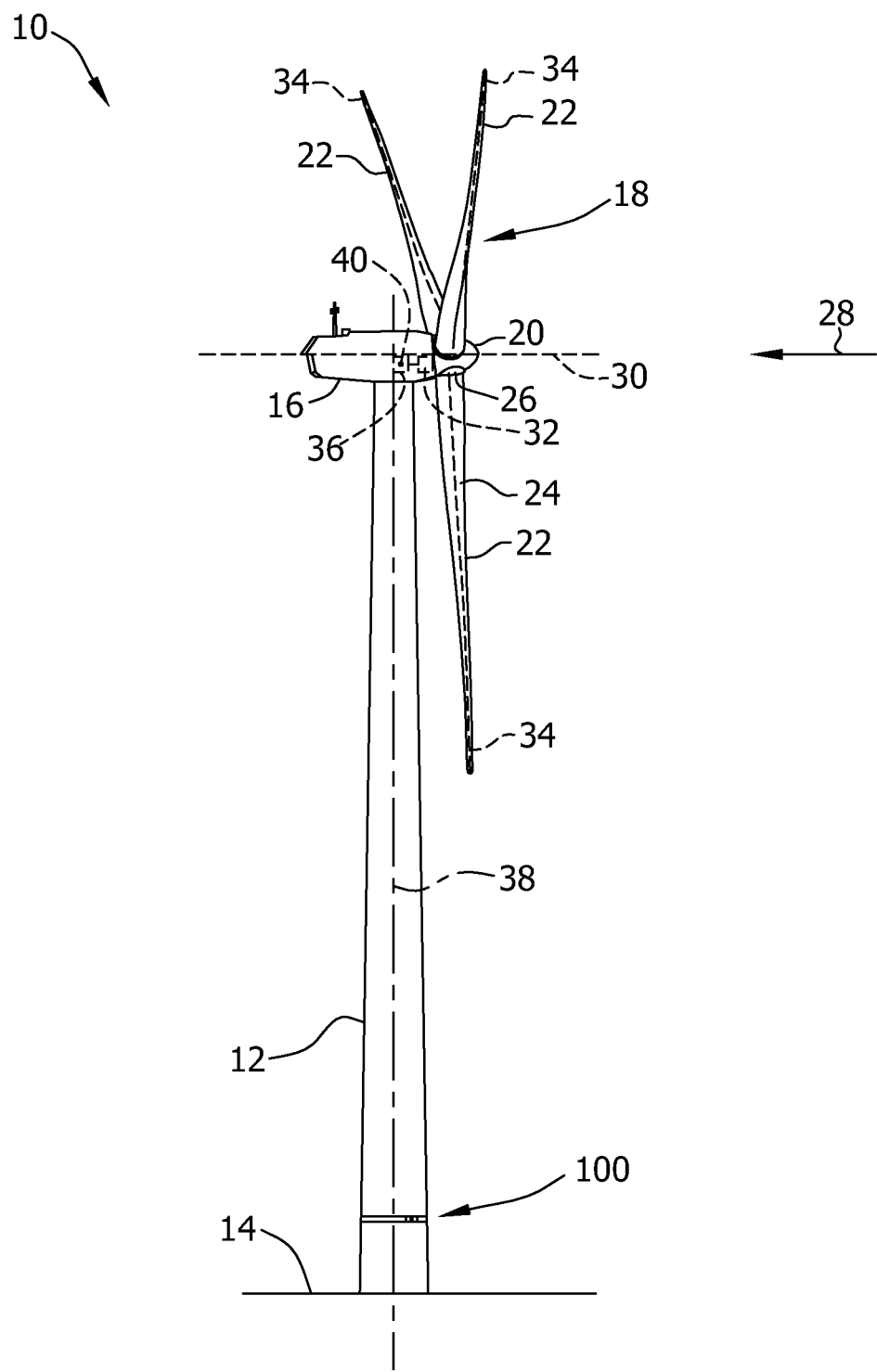
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

As used herein, the term "immission point" is intended to be representative of the location or area at which the shadow of the wind turbine rotor can occur (shadow casting). The immission point may vary depending on the geographical arrangement of the wind turbine and the position of the sun.

As used herein, the term "mirror system" is intended to be representative of a single mirror, two mirrors or a plurality of mirrors, such as for example, four, five, six or more mirrors.

As used herein, the term "driving mechanism" is intended to be representative of any type of electric motor capable of moving any one or more of the elements chosen from the following list: the housing, the cover, the single light sensor, one or more shutters and the entire light intensity detection system.

The embodiments described herein include a cost-efficient and reliable wind turbine shadow flicker protection system that allows changing the operational state of the wind turbine in dependence of the measured shadow situation. In particular, it may be possible to perform a controlled reduction of the tip speed of the blades of a wind turbine or to shut-down the wind turbine completely (e.g. via a shut-down protocol) in order to avoid the effect of shadow flickering. Further, the embodiments described herein allow for the use of a single light sensor to determine if the tip speed of the rotor is to be reduced or a shut-down protocol of the wind turbine initiated. This single light sensor may enable a simplified and more cost efficient design of the wind turbine shadow flicker protection system.

In addition, embodiments herein describe a method for operation of a wind turbine, which change the operational state of the wind turbine, such as by shutting down the wind turbine, when a predetermined light intensity condition is exceeded in order to prevent shadow flicker at an immission point. The light intensity condition of interest herein is typically understood as the directed light intensity. In other words, brightness as such may not constitute a condition that leads to a change of the operational status of the wind turbine. Only if the position of the sun is such that undesired flicker has to be expected at, for instance, an adjacent housing area, it may be desired to change the operational state of the wind turbine, e.g., to shut it down.

According to embodiments herein, the method for operation of a wind turbine may, for instance, include the steps of comparing the intensity of light detected from a first direction and from a second direction, and operating the wind turbine in dependence of the calculated light signal error, i.e. change the operational state of the wind turbine if the light signal error exceeds a predetermined limit. If the predetermined limit is not exceeded, the wind turbine may remain in its normal operational state.

The advantageous method according to embodiments described herein allows for the measurement of a first and second intensity of light via a single light sensor from light of a first direction at a first time and from light of a second direction at a second time, respectively. Based on these measurements, the light intensity condition, in particular the direction of the sun light may be calculated therefrom. The shut-down protocol of the wind turbine may then be initiated by a processor in case the condition exceeds a predetermined value, which turns-off the wind turbine.

The shut-down protocol of the wind turbine may further take into account any one or more of the following, the position of the wind turbine and the immission point, the time of the day, the season, calendar year and other factors that may influence the shadow flicker of a wind turbine. Following the shut-down of the wind turbine, an activation protocol may be initiated. According to embodiments herein, the activation protocol may be initiated once the light intensity conditions drop below a predetermined value.

According to embodiments herein, the single light detector may continuously monitor the light intensity condition and once the light intensity condition is below a predetermined value for a predetermined amount of time, the wind turbine may re-start. The light intensity condition may be an average value taken from multiple individual light intensity measurements over a predetermined period of time. Accidental activation of the wind turbine, for instance, by rapid passage of clouds in front of the sun may thus be prevented.

In embodiments described herein, activation of a wind turbine after having been shut down via the shut-down protocol may take into account any one or more of the following criteria: position of the sun, position of the wind turbine, single light sensor reading or average reading over a predetermined amount of time, wind speed and the direction of the wind.

According to embodiments herein, a light intensity detection system is described that includes a single light intensity sensor, hereinafter also referred to as single light sensor, which is adapted to measure the intensity of light. The single light sensor may be arranged in a housing to protect it from environmental influences such as, for instance, pollution, frost and snow. In embodiments herein, the housing may include a cover. The housing and the cover may be adapted to be moveable relative to one another.

Not limited to any particular embodiment described herein, the housing may include a draining system, for example, a condensate drainage system. According to embodiments herein, the housing may include openings in order to avoid water accumulation inside of the housing. The one or more openings may be arranged along the bottom of the housing. According to yet further embodiments herein, the bottom of the housing (i.e. the floor or bottom wall of the housing) may have a mesh-type structure that permits fluids to pass therethrough.

The cover of the housing of the light intensity detection system may include one or a plurality of windows, which may be covered by an optically transparent material such as an acrylic glass or any type of glass such as, e.g., soda-lime glass. The one or more windows may include a water and or dirt repellent transparent coating, e.g. a nano-coating. Light from outside of the housing may pass through the transparent window onto the single light sensor arranged on the inside of the housing. According to embodiments described herein, the window(s) may be heatable, for instance, for de-icing during cold weather conditions.

According to embodiments herein, the light intensity detection system may include an enclosure. The enclosure may at least partially surround the housing, including the cover of the light intensity detection system. The enclosure may, for example, be made of an optically transparent material and include a water and or dirt repellent transparent coating, such as for instance a nano-coating. In embodiments described herein, the enclosure may for example be a glass dome protecting the mechanical and optical components of the light intensity detection system for environmental influences.

Not limited to any particular embodiment described herein, all the mechanical and optical components of the light intensity detection system may be included inside of its housing. The more sensitive control unit may be arranged separately, for instance, inside of the nacelle or tower of the wind turbine. The light intensity detection system may be connected to an electrical feed and signal line via the wind turbine. Allowing the more sensitive elements, such as the control unit to be installed inside of the wind turbine tower enables the light intensity detection system described herein to be installed on wind turbines that can operate in extreme weather conditions e.g. at temperatures ranging anywhere from −40° C. to +50° C. Alternatively, the light intensity detection system according to embodiments described herein may include all the optical components, mechanical components and electrical control units inside of its housing.

The modularity of the herein described light intensity detection system facilitates its installation in existing wind turbines and also ensures easy access to components of the light intensity detection system during maintenance and repairs.

According to yet further embodiments herein, the light intensity detection system may include a heating and/or cooling system, which allows the light intensity detection system to be installed on wind turbines or in the proximity of wind turbines in different environments. For instance, a heating system may facilitate the reliable operation of the light intensity detection system in cold weather environments. In embodiments herein, the light intensity detection system may include a ventilation system in order to prevent fogging of the enclosure and/or the one or more glass windows. Not limited to any one particular embodiment, heated air may be stirred by the rotation of the housing and/or cover of the light intensity detection system. Thus, a single heating element may be sufficient for heating and ventilating the light intensity detection system according to embodiments described herein.

The cover may be moveable with respect to the housing. In embodiments described herein, the housing and the single light sensor may be fixed (i.e. not moveable). This feature may help the routing of power cables and data lines.

According to embodiments herein, the cover may be freely moveable by 360° around a longitudinal axis of the housing, thereby allowing light to enter into the housing from any direction. The cover may move with respect to the housing into a first position, allowing light to enter through the window into the housing and onto the single light sensor from a first direction. The cover may subsequently move or rotate with respect to the housing into a second position allowing light to enter through the window into the housing and onto the single light sensor from a second direction. Subsequently, the cover may repeat its motion and move back to the first position followed by the second position. According to embodiments herein, the number of times and the time interval between the positions may depend on the specific requirements of light detection.

The time interval between moving the cover from the first position to the second position may be selected. For example, in order to measure the current difference in light intensity from light entering into the housing from the first and second direction, the time interval between rotating the cover from the first to the second position may be relatively short, like for instance, less than 1 s (seconds). Alternatively, the time interval between rotating the cover from the first to the second position may be 10 s, 30 s, 1 min (minute) or 1 h (hour). An operator may define the time interval. It is possible that the time interval is stored in a data base of the light detection system or the control system.

According to embodiments herein, the cover may move or rotate continuously, for instance, at a frequency of 10 Hz, 30 Hz or 50 Hz, whereby the single light sensor may measure the light intensity from light entering the housing from all directions (e.g. with an azimuth angle from 0° to 360°). Assuming a substantially constant sun light during the movement, the detected light signal will be a continuous signal with a sinus-like shape.

Depending on the particular shape and arrangement of the light intensity detection system, a mirror system may be arranged inside the housing in order to reflect the light entering into the housing onto the single light sensor. The mirror system allows for a flexible arrangement of the single light sensor inside of the housing.

According to embodiments herein, the mirror system may be a conical mirror arranged inside of the housing. The conical mirror may be stationary and reflect light entering the housing from all directions onto the single light sensor.

In yet further embodiments, the mirror system may be fixed to the cover and rotate with the cover in order reflect light entering the housing from all directions onto the single light sensor. Such a rotating mirror system may, for instance, include a flat or plane mirror, which may reduce the cost of ownership of the light intensity detection system. Further, the mirror system may include one or more curved mirrors allowing light from an angle range to be reflected onto the single light sensor. The mirror system may be arranged to allow the single light sensor to receive light from all direction, i.e. covering a full sphere. According to embodiments herein, the mirror system may also include parabolic, hyperbolic, spherical or elliptical mirrors to reflect light onto the single light sensor.

According to embodiments described herein, the mirror system may include one or more mirrors for reflecting the light, entering into the housing, onto the single light sensor. The mirror system may enable a high degree of flexibility for designing the light intensity detection system.

In yet further embodiments described herein, the light intensity detection system may be configured such that the single light sensor is moveable with respect to the housing. The single light sensor may, for instance, be arranged on a hollow moveable or rotatable shaft. The hollow shaft may provide free space for power cables and data lines.

According to embodiments herein, the housing of the light intensity detection system may include at least two windows. The windows may allow light from two distinct directions to enter into the housing of the light intensity detection system. The moveable or rotatable single light sensor may first be positioned to measure the intensity of the light entering into the housing from the first window. Subsequently, the single light sensor may move or rotate, for instance, about its longitudinal axis, to be positioned for measuring the intensity of the light entering into the housing from the second window.

According to embodiments described herein, the housing may include a single window. The single window may be configured to go completely around the housing, thereby allowing light to enter into the housing from every direction. According to embodiments herein, the single window may separate the housing into an upper part and lower part. In other words, the single window may be a continuous window going around the housing permitting light to enter into the housing from a 360°.

The embodiments described herein may include more than two windows, like for example, three, four or more windows. For example, if the housing is configured to be in a rectangular box-shape with four side walls, a top and a bottom wall, a total of four windows may be arranged one on each of the four side walls. Thereby, light may enter into the housing from at least four opposite directions, for instance, from the four cardinal or intercardinal directions. The light intensity detection system may include a shutter device or shutter system, which is configured to control through which window light may enter into the housing. For instance, each window may be provided with a shutter that permits light to enter into the housing when the shutter is in an open state and to prevent light from entering into the housing when the shutter is in a closed state, respectively.

According to embodiments herein, the single light sensor may move from a first position and detect the intensity of light from a first direction to a second position and detect the intensity of light from a second direction. Not limited to any particular embodiments described herein, the aforesaid first direction and second direction from which light is detected may be distinct from each other. A driving mechanism may rotate the single light sensor via, for example, a shaft from the first position to the second position.

According to further embodiments described herein, the single light sensor may rotate continuously, thereby continuously detecting light from all directions, thus producing a continuous signal with a sinus-like shape. In yet further embodiments, the single light sensor may rotate continuously and take light intensity measurements at particular predetermined time intervals. For instance, if the single light sensor rotates at four revolutions per minute, it may take light intensity measurements at a continuous time interval of 10 s (seconds), 20 s or 30 s.

In yet further embodiments described herein, the single light sensor may, for instance, take a first light intensity measurement at a first position facing the sun and subsequently rotate to a second position, opposite the first position, to take a second light intensity measurement. In the context herein, the term "subsequently" is intended to be representative of a time interval of a few seconds, such as for instance 2 s (seconds), 4 s, 10 s, 15 s or 25 s, between taking the light intensity measurements with the single light sensor at the first and second positions, respectively. The difference in light intensity between these two measurements may be computed by, for instance, a processor and if the difference exceeds a predetermined value, a change in the operational status of the wind turbine may be caused, for example, shutting-down the wind turbine.

According to further embodiments described herein, the single light sensor and the housing may be moveable or rotatable together. The housing may have a window through which light may enter into the housing and the light intensity be measured by the single light sensor. The housing and the single light sensor may be connected to a moveable or rotatable shaft, which may rotate the single light sensor and the housing by a 360° (i.e. a full revolution) around the longitudinal axis of the shaft. Thereby, the single light sensor may be rotated from a first position to a second position in order to make a first and a second light intensity measurement respectively. Again, according to this embodiment, the single light sensor may rotate with the housing continuously or to predetermined positions for light intensity measurements.

According to yet further embodiments described herein, the single light sensor and its housing may be arranged moveable around the outside of the tower of a wind turbine. Thereby, the single light sensor may receive light from a first direction at a first time and from a second direction at a second time. A driving mechanism may move the single light sensor and its housing from a first position to a second position around the outside surface of the wind turbine tower such that the single light sensor may take at least two light intensity measurements in a first position and second position, respectively.

A guiding device including, for example, a first rail system may facilitate the movement of the single light sensor and the housing around the circumference of the wind turbine tower. The first rail system may be oriented horizontally completely surrounding the tower of the wind turbine.

According to yet further embodiments, the guiding device may include a second rail system that may be attached to outside of the tower wall in a vertical orientation. The driving mechanism may move the single light sensor and its housing in a vertical direction up or down the tower wall of the wind turbine.

Not limited to any one particular embodiment described herein, the light intensity detection system may be arranged to the tower or on top of the nacelle of a wind turbine. The light intensity detection system may, for example, be mounted at the south side of the wind turbine in order to mitigate the impact of the wind turbine itself. Further, the light intensity detection system may be arranged in the proximity of the wind turbine, e.g., in the circumferential area around the wind turbine within a radius of, for instance, 10 m (meters), 30 m, 50 m, 100 m or more. The distance at which the light intensity detection system is arranged from the wind turbine may depend on the shadow casting area of the wind turbine.

According to embodiments herein, a single light intensity detection system may be utilized to control a plurality of wind turbines in, for instance, a wind farm. The wind farm owner may decide which turbines are more prone to the issue of shadow flicker and should therefore be equipped with the light intensity detection system. Some of the criteria that may be taken into account are: the installation site of the wind turbine (e.g. close or far away to a residence) and the movement of the sun across a year.

According to embodiments herein, more than one light intensity detection system may be arranged on or near a single wind turbine. Each light intensity detection system may operate independently of one another, which may increase the reliability of the system. The more than one light intensity detection systems may also be linked together and monitored by control software to ensure proper functioning of each light intensity detection system. The control software may compare the measurements of one light intensity detection system with that of at least one other light intensity detection system in order to, for instance, determine a malfunction.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height. For instance, the tower can be made of concrete, or be a framework tower such as a lattice or truss tower. A light intensity detection system 100 according to embodiments herein is arranged on the tower 12. In embodiments herein, the light intensity detection system may be arranged anywhere along the tower of the wind turbine.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
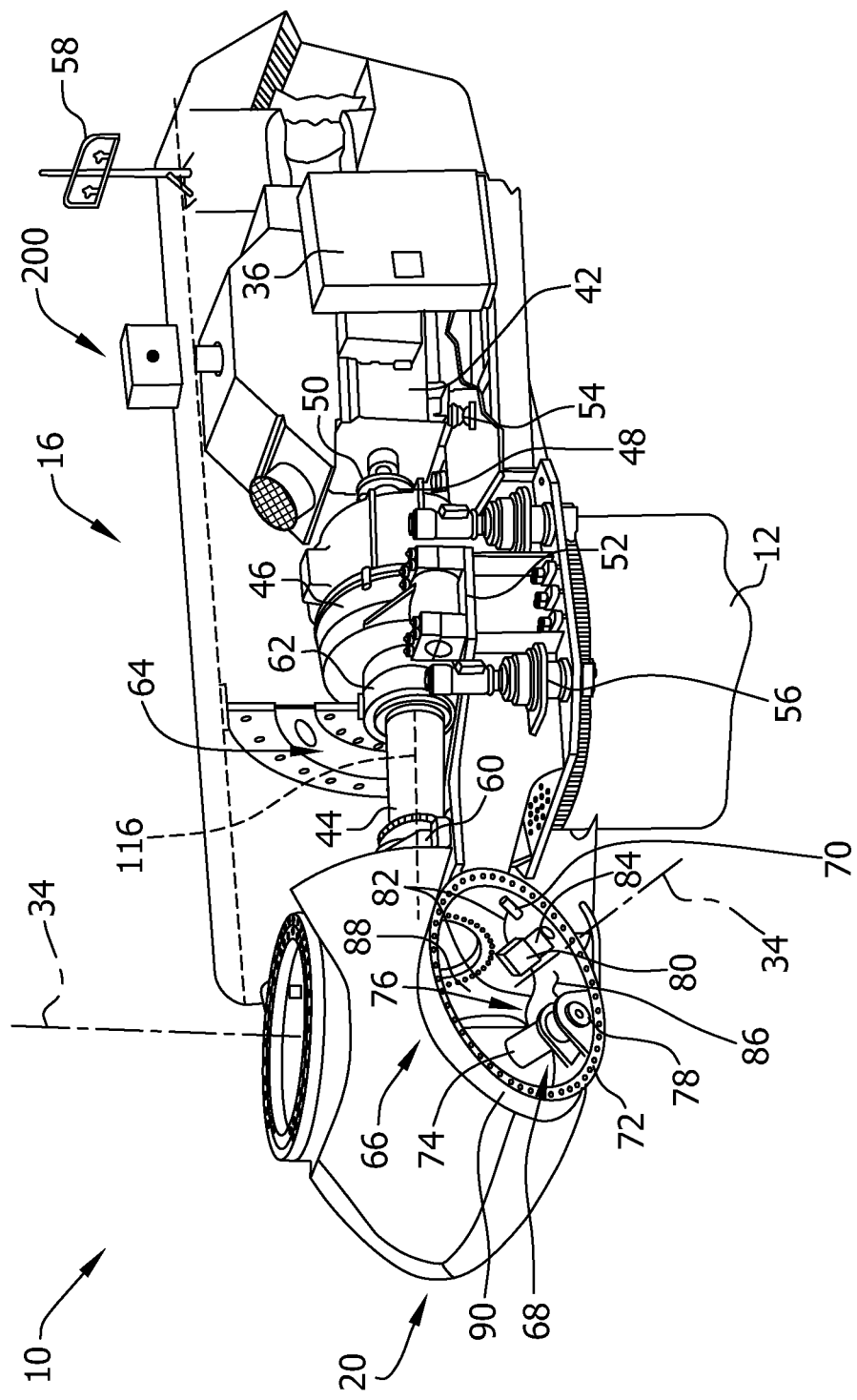
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50. A light intensity detection system 200 according to embodiments herein is arranged on the nacelle 16. The light intensity detection system 200 may be arranged to the nacelle 16 of the wind turbine 10 via some brackets or a fixture (not shown in the figures). Further according to embodiments herein, the wind turbine may include a shadow control cabinet, which facilitates the communication between the single light sensor and the wind turbine cabinet (MCC or DTA). In embodiments herein, the light intensity detection system may be integrated into the nacelle of a wind turbine. Any light intensity detection system as described herein and with particular reference to the light intensity detection systems 300, 301, 400, 500 and 600 in FIGS. 3-8, may be positioned at or adjacent to the nacelle.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

In the exemplary embodiments described herein, controller is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 102 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome.

Figure 3:
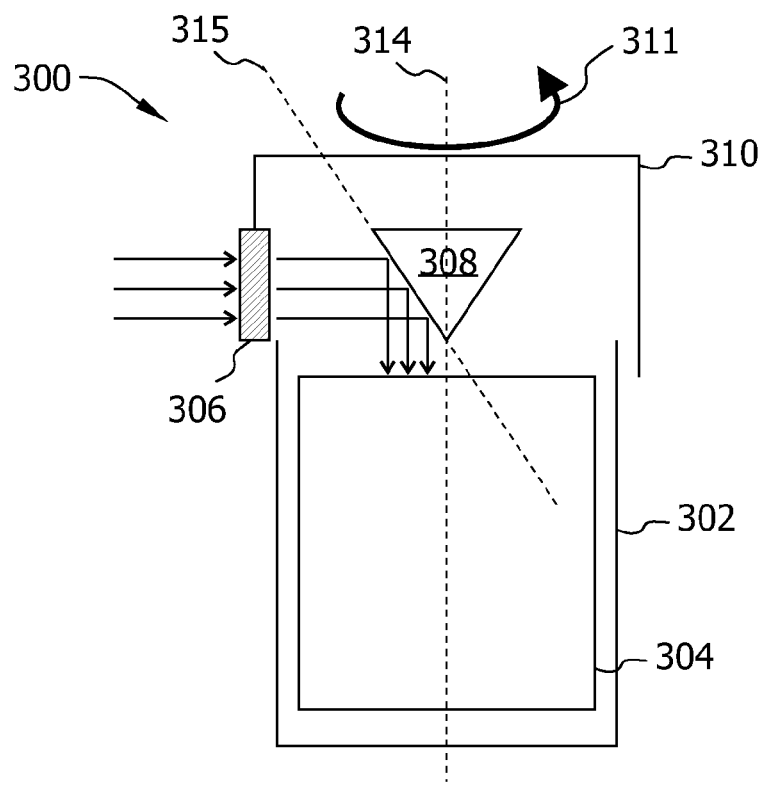
FIG. 3 is a schematic drawing showing a shadow flicker protection system according to embodiments described herein.

According to embodiments herein, FIG. 3 shows a light intensity detection system 300 for measuring light intensity from two directions in order to determine if the operational state of a wind turbine needs to be changed. The light intensity detection system 300 includes a housing 302. According to embodiments herein, the housing may be made of a corrosion resistant material, such as, for instance a metal alloy. Not limited to any particular embodiment described herein, the housing may be of any shape such as, for example, rectangular.

The light intensity detection system 300 further includes a single light sensor 304 arranged inside of the housing 302. The single light sensor 304 may be arranged inside of the housing 302 so that it is protected from environmental influences such as rain, wind and snow. According to the embodiment shown in FIG. 3, the light intensity detection system 300 further includes a cover 310.

According to embodiments herein, the cover 310 may include a window 306, which may include a protective optically transparent material such as, for instance glass. However, according to embodiments herein the window may also be an opening. The window 306 may be integrated in the cover 310. The window 306 may be arranged on a side surface of the cover such that it may face one of the cardinal directions when the light intensity detection system is arranged in a horizontal position. Not limited to any particular embodiment described herein, the window may be of any shape, such as, for example, oval-, circular-, rectangular- or square-shaped.

The window 306 may be dimensioned to permit light to enter into the housing 302. Further, according to the embodiments described herein, the window(s) may be heatable in order to, for instance, prevent ice or snow from blocking light to enter into the housing via the window.

According to embodiments herein, an enclosure may at least partially surround the housing and cover of the light intensity detection system. The enclosure may itself include one or more openings or windows allowing light from the outside to be redirected onto the single light sensor. For instance, the enclosure may be a glass dome protecting the mechanical and optical components of the light intensity detection system. The glass dome may be heatable to ensure proper light incidence onto the single light sensor even in cold environments, i.e. any snow and/or ice on the glass dome would immediately melt. The enclosure may be coated with a water and/or dirt repellant coating.

The cover 310 and the housing 302 may be configured to be moveable with respect to each other. For instance, the cover 310 may be rotatable with respect to the housing 302. The movement of the cover 310 with respect to the housing 302 is shown by arrow 311 in FIG. 3.

A driving mechanism (not shown in FIG. 3) may rotate the cover 310 in both a clockwise and counterclockwise direction. The driving mechanism may, for instance, be an electric motor arranged inside of the housing 302. Alternatively, the driving mechanism or a part thereof may be located on the outside of the housing 302.

Not limited to any particular embodiment described herein, the driving mechanism may be configured to allow the single light sensor to receive light from a first direction at a first time and from a second direction at a second time, respectively. For instance, in the embodiment shown in FIG. 3, the driving mechanism may rotate the cover 310, including the window 306 around the longitudinal axis 314 of the light intensity detection system 300.

According to embodiments herein, the driving mechanism may rotate the cover from a first position such that the window 306 faces the south direction to a second position such that the window 306 faces the north direction. In the first position light may enter into the housing 302 via the window 306 from the southern direction. In the second position light may enter into the housing 302 via the window 306 from a northern direction.

In embodiments described herein, the driving mechanism may rotate the cover 310 continuously around the longitudinal axis 314 of the light intensity detection system 300, such that the light from all directions may enter into the housing 302 and onto the single light sensor 304 via the window 306 of the rotating cover 310. The speed at which the cover rotates may be predetermined and chosen freely by the operator of the wind turbine.

According to embodiments herein, the light intensity detection system may include a mirror system, which is adapted to reflect incoming light, entering the housing, onto the single light sensor. For instance, in the embodiment shown in FIG. 3, a conical mirror 308 may be arranged inside of the housing 302 in order to reflect incoming light onto the singe light sensor 304. In embodiments herein, the conical mirror 308 may be stationary.

In yet further embodiments herein, the mirror system may include a mirror system that rotates together with the cover. The mirror system may be fixed to the cover such that a single driving mechanism may rotate both the cover and the mirror system. The cover, the mirror system and the window may be viewed as one rotating object. According to embodiments herein, the mirror system may be a flat mirror, for example, arranged such that the reflected light is directed towards the single light sensor. For instance, a flat or planar mirror instead of the conical mirror 308 may be arranged along axis 315 in the embodiment shown in FIG. 3. As opposed to the conical mirror 308, the flat mirror may be fixed to the cover 310 and rotate together with the cover 310.

The mirror system may include one or more mirrors arranged on the inside or outside of the housing in order to reflect light from different directions onto the single light sensor. The single light sensor may remain inside of the housing, where it is protected from any environmental influence but may yet receive light from all directions.

Figure 4:
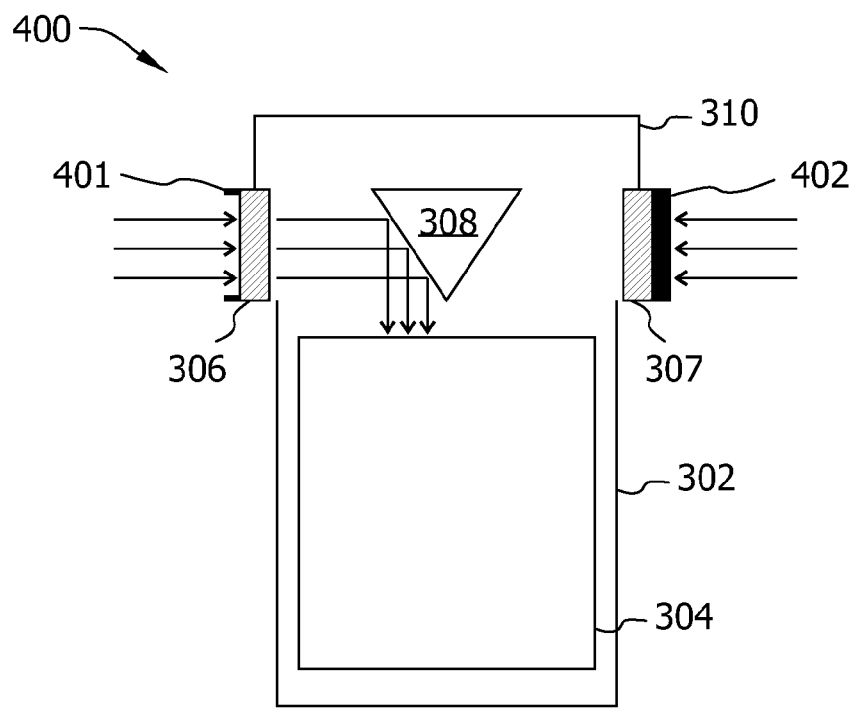
FIG. 4 is a schematic drawing showing a further shadow flicker protection system according to embodiments described herein.

FIG. 4 shows a light intensity detection system 400 according to embodiments described herein. Similar to the embodiment shown in FIG. 3, the light intensity detection system 400 includes a housing 302, a single light sensor 304 and a mirror system, such as, for instance, a conical mirror 308 adapted to reflect light from the outside onto the single light sensor 304 arranged inside of the housing 302.

The light intensity detection system 400 further includes at least a first window 306 and a second window 307 each positioned on a separate side wall of the cover 310. According to embodiments herein, the first and second windows may be arranged on opposite side walls of the cover such that they are opposite to each other. In yet further embodiments herein, the cover may include more than two windows such as for instance three, four or more windows. For example, at least one window may be arranged on every side wall of the cover allowing light to enter into the inside of the housing from every cardinal direction. The mirror system may assist light entering into the housing for being reflected onto the single light sensor.

In yet further embodiments herein, the window(s) may be arranged on a side wall of the housing of the light intensity detection system. In embodiments herein, wherein the light intensity detection system lacks a distinct cover but instead only includes a housing completely surround the single light sensor, the at least first and second window or the plurality of windows may be arranged on one or more side walls of the housing.

According to the embodiment shown in FIG. 4, a shutter system including a first shutter 401 and a second shutter 402 may be arranged at each window 306, 307 of the light intensity detection system 400. The shutter system may be arranged on the outside or on the inside of the cover 310. In embodiments herein the shutter system may also be arranged on the outside or on the inside of the housing of the light intensity detection system.

The shutter system may be adapted to open and close in order to allow light to enter into the housing when being in an open state and preventing light from entering into the housing when being in a closed state. According to the embodiment shown in FIG. 4, in order to detect the light intensity of light from at least two distinct directions, the first shutter 401 may be opened to allow light from a first direction to enter into the housing and the second shutter 402 may be closed, thereby preventing light from a second direction to enter into the housing. The light from the first direction which enters via the first window 306 into the housing 302 may be reflected by the conical mirror 308 onto the single light sensor 304.

The period of time that the shutters remain in an open or closed state may be pre-adjusted by the wind turbine operator depending on the specific requirements of light detection. According to embodiments herein, a shutter may be arranged at each window of the light intensity detection system.

In yet further embodiments herein, a single window going around the circumference of the cover and/or housing of the light intensity detection system may include a shutter system that may be controlled to be opened at a first location and to be closed at a second location. Thereby, light may be permitted to enter into the housing via the first location from a first direction and be prevented from entering into the housing via the second location from a second direction.

According to embodiments herein, the shutter system may be arranged to only allow light from entering into the housing and thereby onto the single light sensor from one direction at a particular point in time.

Figure 5:
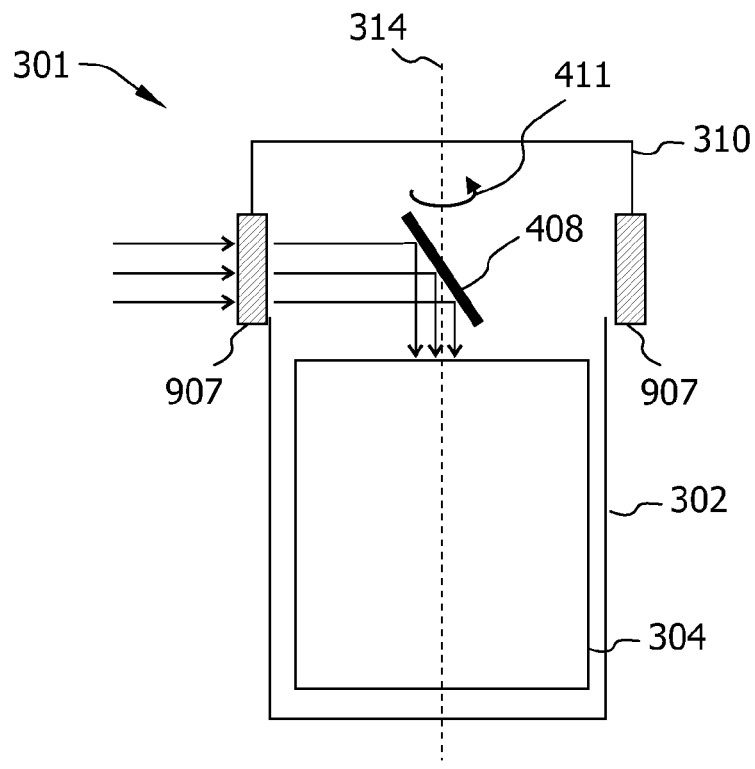
FIG. 5 is a schematic drawing showing yet a further shadow flicker protection system according to embodiments herein.

FIG. 5 shows a light intensity detection system 301 according to embodiments herein. The flat mirror 408 may be arranged rotatable (along arrow 411) with respect to the cover 310. The cover 310 may include a continuous window 907 which allows light from all directions to enter into the housing 302. The single light sensor 304 and the flat mirror 408 may be rotatable with respect to the housing 302 (see also the description to FIG. 6 below for more details). According to further embodiments herein, the flat mirror may be attached to a rotatable cover which also allows light from all directions to be reflected onto the single light sensor (see also the description to FIG. 3 above for more details).

Figure 6:
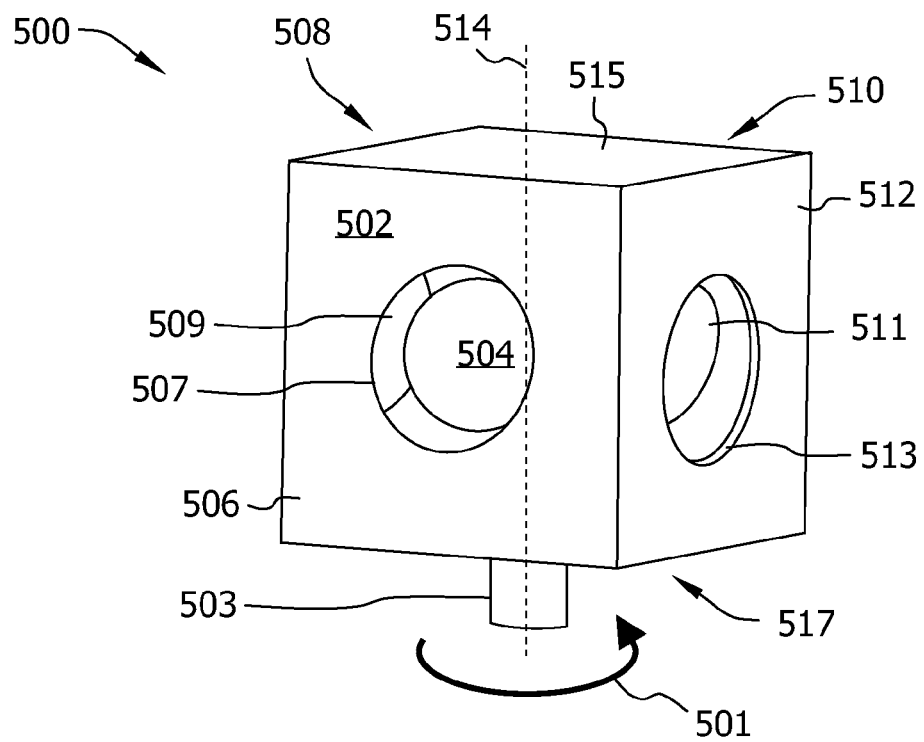
FIG. 6 is a schematic drawing showing yet a further shadow flicker protection system according to embodiments described herein.

FIG. 6 shows a light intensity detection system 500 according to a further embodiment described herein. The system 500 includes a housing 502 and a single light sensor 504. The housing 502 may be configured to include four side walls 506, 508, 510 and 512, respectively. The housing may also include a top wall 515 arranged to interconnect the aforementioned four side walls and a bottom wall 517 also arranged to interconnect the aforementioned four side walls. According to embodiments herein, the housing may have a plurality of shapes and therefore is not limited to a cube having four side walls. For instance, according to embodiments herein the housing may have a circular or spherical shape with a single continuous side wall.

Each of the side walls 506, 508, 510 and 512 of the light intensity detection system 500 may include a window 507, 509, 511, and 513. The window may be arranged in such a way that it does not interfere with the integrity and stability of the housing 502. The number of windows, their shapes and sizes may vary depending on the required amount of light and direction of the light desired to enter into the housing from the external environment. For instance, the optically transparent window may be designed to allow outside light rays to get into the housing from, for instance, 360°. Such a window may be continuous around the circumference of the housing.

According to embodiments herein, the light intensity detection system 500 may include a driving mechanism configured to allow the single light sensor to receive light from a first direction at a first time and from a second direction at a second time, respectively. In FIG. 6, the light intensity detection system 500 is configured such that the single light sensor 504 is arranged on a moveable shaft 503. The shaft 503 may be arranged such that it rotates around the longitudinal axis 514 of the light intensity detection system 500. By rotating the shaft 503, the position of the single light sensor 504 may be altered accordingly.

For example, the single light sensor 504 may be rotated via the shaft 503 into a first position facing the first window 507. The single light sensor 504 may receive light from a first direction and detect the intensity of the received light. Subsequently, the single light sensor 504 may be rotated via the shaft 503 into a second position facing the second window 509. The single light sensor 504 may then receive light from a second direction and detect the intensity of the received light. Thereafter, the single light sensor 504 may be rotated via the shaft 503 into a third position facing the third window 511. The single light sensor 504 may then receive light from a third direction and detect the intensity of the received light. Further, thereafter the single light sensor 504 may be rotated via the shaft 503 into a fourth position facing the fourth window 513. The single light sensor 504 may then receive light from a fourth direction and detect the intensity of the received light.

The rotation of the shaft 503 and the single light sensor 504 as described above allows for the detection of the intensity of light from four different directions. According to embodiments herein, the single light sensor 504 may be rotated via the shaft 503 from a first to a second position. In the first position the single light sensor 504 may be facing, for instance, the first window 507, and in the second position the single light sensor 504 may, for instance be facing the third window 511. In this way, the single light sensor 504 may measure the intensity of light entering the housing 502 from two opposite directions.

Not limited to any particular embodiment described herein, the single light sensor may be rotated via a driving mechanism, such as a rotatable shaft, in order to measure the intensity of light entering into the housing of the light intensity detection system from at least two different directions. For the purpose thereof, the single light sensor may rotate at least to a first position at a first time and to a second position at a second time. However, the single light sensor according to embodiments herein may also rotate via the driving mechanism to five, six, seven or more positions in order to measure the intensity of light entering into the housing from five, six, seven or more directions, respectively.

According to embodiments herein, irrespective of the shape of the housing, the housing may include a continuous window, which permits light to enter the housing from all the cardinal directions. In embodiments herein, the single light sensor may rotate continuously via the driving mechanism such that the detected light signal may be a continuous signal with a sinus-like shape.

Figure 7:
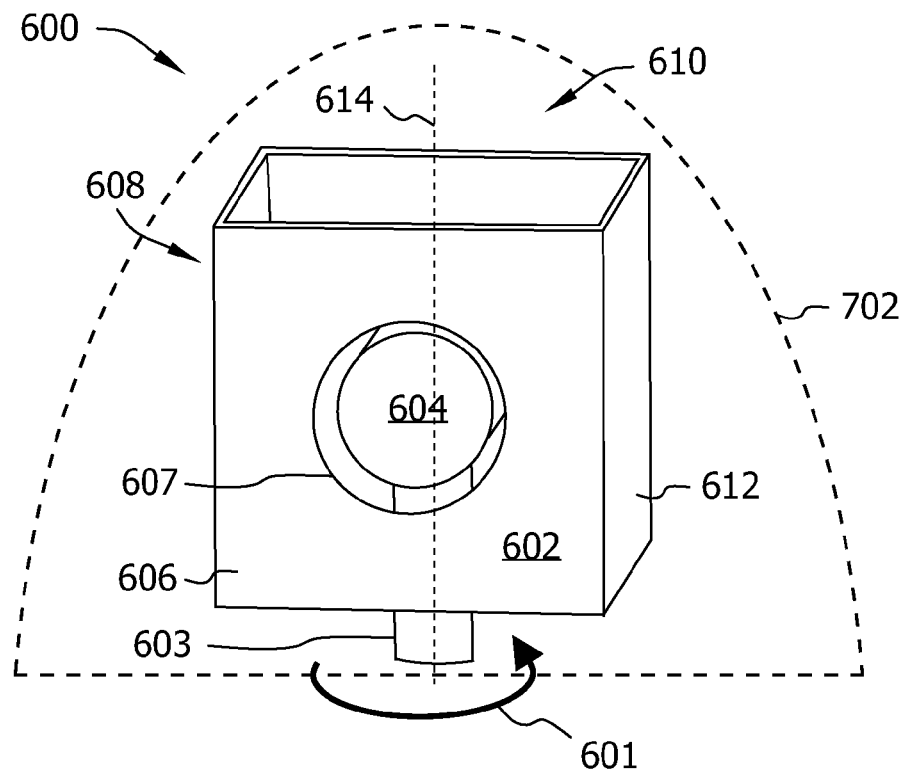
FIG. 7 is a schematic drawing showing yet a further shadow flicker protection system according to embodiments described herein.
Figure 8:
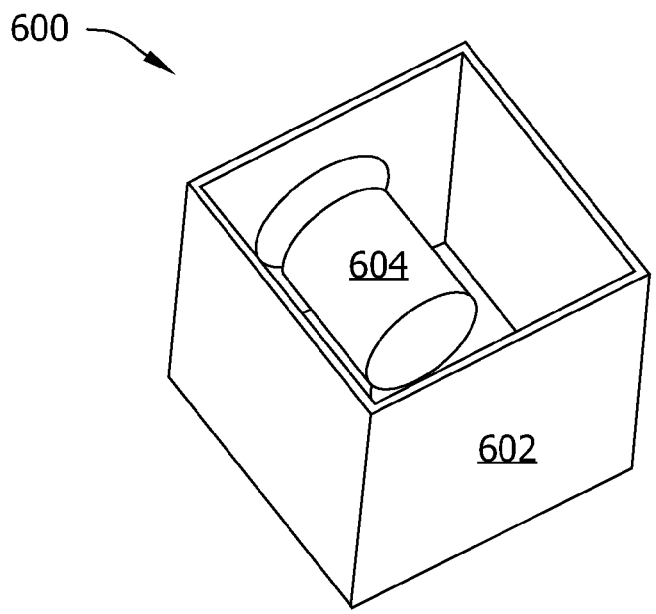
FIG. 8 is a schematic drawing showing a different perspective of the shadow flicker protection system shown in FIG. 7.

FIG. 7 and FIG. 8 show a light intensity detection system 600 according to embodiments herein. Similar to the previous embodiments, the light intensity detection system 600 includes a housing 602 and a single light sensor 604. The housing 602 includes four side walls 606, 608, 610 and 612. The housing 602 includes a single window 607 arranged across from the single light. According to embodiments herein, the window may be arranged on any side wall of the housing and alternatively may not be directly opposite to the single window but may be arranged to receive light via the single window through, for instance, a mirror system. The top of the housing 602 of the embodiment shown in FIG. 7 and FIG. 8 may be open to the external environment. In alternative embodiments, the housing 602 may include a top wall (e.g. a cover). According to embodiments herein, the housing may have a plurality of shapes and therefore is not limited to a cube having four side walls. For instance, according to embodiments herein the housing may have a circular or spherical shape with a single continuous side wall. Not limited to any one particular embodiment described herein, the light intensity detection system may include an enclosure 702, such as for instance a glass dome, which protects the optical and mechanical components of the light intensity detection system from environmental influences.

According to embodiments herein, the light intensity detection system 600 may include a driving mechanism configured to allow the single light sensor to receive light from a first direction at a first time and from a second direction at a second time, respectively. In FIGS. 7 and 8, the light intensity detection system 600 is configured such that the housing 602 is arranged on a moveable shaft 603. The shaft 603 may be arranged such that it rotates around the longitudinal axis 614 of the light intensity detection system 600. By rotating the shaft 603, the direction in which the single light sensor 604 is facing may be changed accordingly. The rotation of the shaft including the single light sensor 604 inside of the housing 602 is indicated by arrow 601. According to embodiments herein, the shaft may rotate in both a clockwise and counterclockwise direction.

For example, the housing 602 including the single light sensor 604 may be rotated via the shaft 603 into a first position facing a first cardinal direction, e.g. south. The single light sensor 604 may receive light from this first direction and detect the intensity of the received light. Subsequently, the housing including the single light sensor 604 may be rotated via the shaft 603 into a second position facing a second, different direction, e.g. north. The single light sensor 604 may then receive light from the second direction and detect the intensity of the received light.

Similarly, the housing 602 including the single light sensor 604 may be rotated via the shaft 603 into a plurality of further positions facing a third, a forth, a fifth or more directions. The single light sensor may be measure the intensity of light entering into the housing from every position.

Not limited to any particular embodiment herein, the light sensor including the housing may rotate continuously or rotate to pre-determined positions for taking separate light intensity measurements at each pre-determined position.

Figure 9:
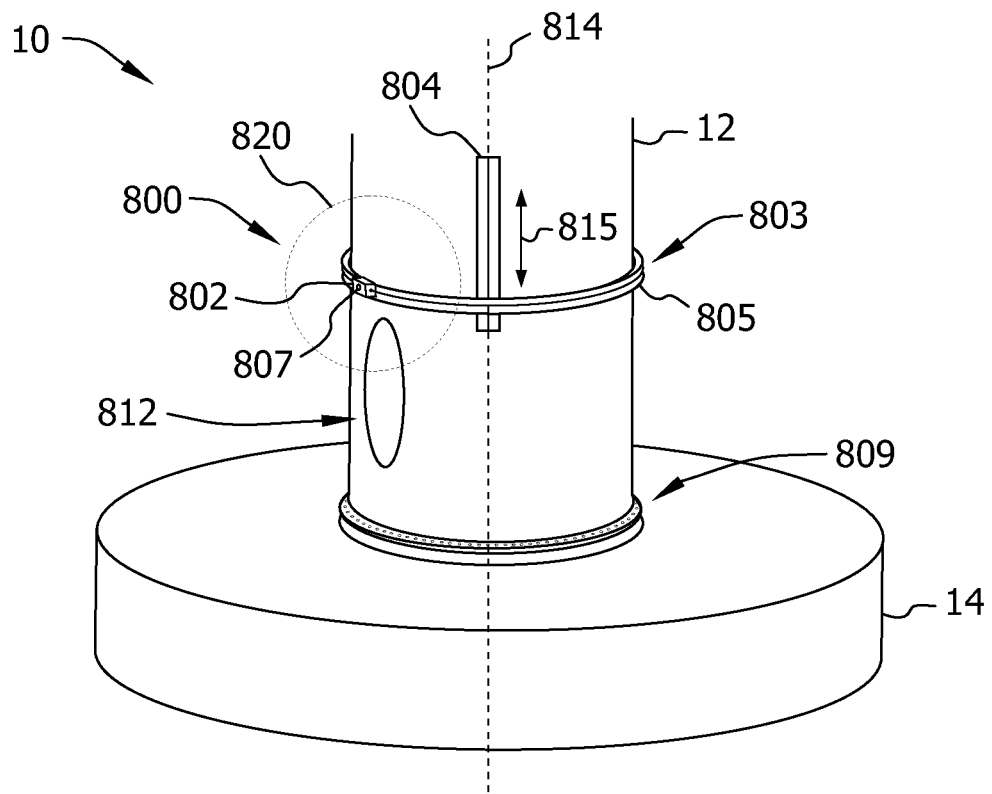
FIG. 9 is a schematic drawing showing a further shadow flicker protection system arranged at the base of the tower of a wind turbine according to embodiments described herein.
Figure 10:
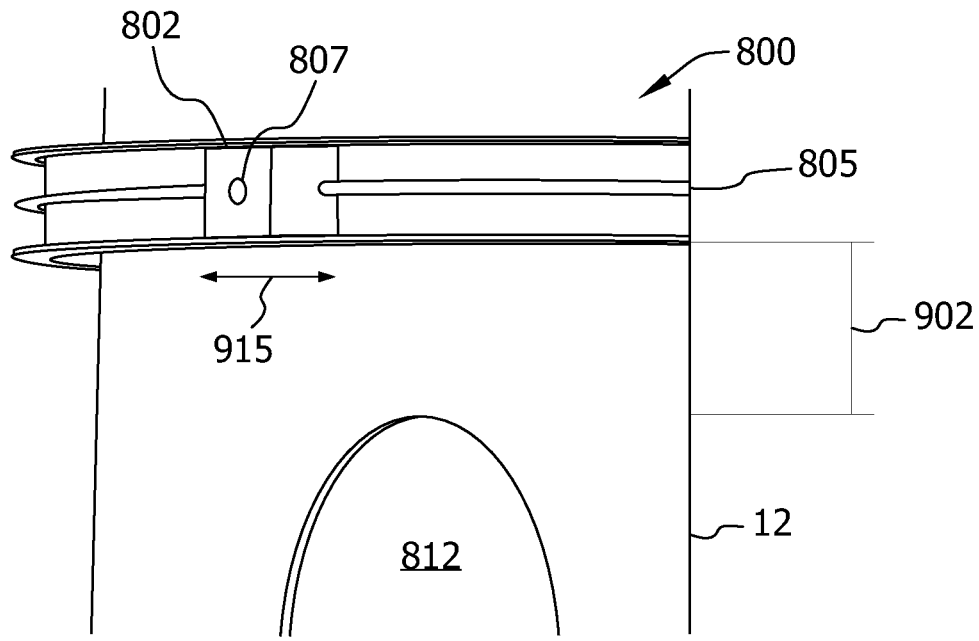
FIG. 10 is an enlarged sectional view of the shadow flicker protection system of FIG. 9.

FIG. 9 and FIG. 10 show a light intensity detection system 800 according to embodiments herein, attached to a wind turbine 10, for instance, to a wind turbine as shown in FIG. 1. FIG. 10 is a magnified view of a section 820 of the wind turbine shown in FIG. 9. The figures show the bottom part of a wind turbine 10 including the bottom part of the wind turbine tower 12, the support system 14 also known as tower foundation or base of the wind turbine and an attachment system 809 for connecting the wind turbine tower 12 to the support system 14. The wind turbine tower 12, optionally, includes an entrance door 812.

The light intensity detection system 800 includes a single light sensor (not shown in the Figs.), a housing 802 and a driving mechanism configured to allow the single light sensor to receive light from a first direction at a first time and from a second direction at a second time, respectively. The housing 802 of the light intensity detection system 800 may include a window 807 arranged on a side wall of the housing 802. The window 807 may be arranged such that during operation of the light intensity detection system it faces away from the wind turbine tower. The driving mechanism may include a guiding device 803 arranged around the tower of the wind turbine such that the light intensity detection system 800 may be displaced along the guiding device from a first to a second position. Alternatively, the light intensity detection system 800 may be continuously moved around the tower via the guiding device and the driving mechanism. For instance, the light intensity detection system may revolve around the wind turbine tower at a frequency of 1 revolution per minute, 10 revolutions per minute or 30 revolutions per minute.

According to embodiments herein, the guiding device may include a first rail system 805 attached around the tower wall in a horizontal orientation. The driving mechanism may be adapted to displace the light intensity detection system 800 along the first rail system 805.

According to further embodiments herein, the guiding device may optionally include a second rail system 804 attached to the tower wall in a vertical orientation along the longitudinal axis 814 of the wind turbine 10. The driving mechanism may be adapted to displace the light intensity detection system 800 along the second rail system 804 up or down the tower 12 of the wind turbine 10.

According to the embodiments described herein, the light intensity detection system 800 may desirably be arranged close to the wind turbine entrance 812 to ensure easy access for maintenance and replacement purposes. The light intensity detection system 800, including the guiding device 803 may, for instance, be arranged 30 cm, 35 cm, 40 cm or more vertically above the entrance door 812 (see reference sign 902 shown in FIG. 10).

Figure 11:
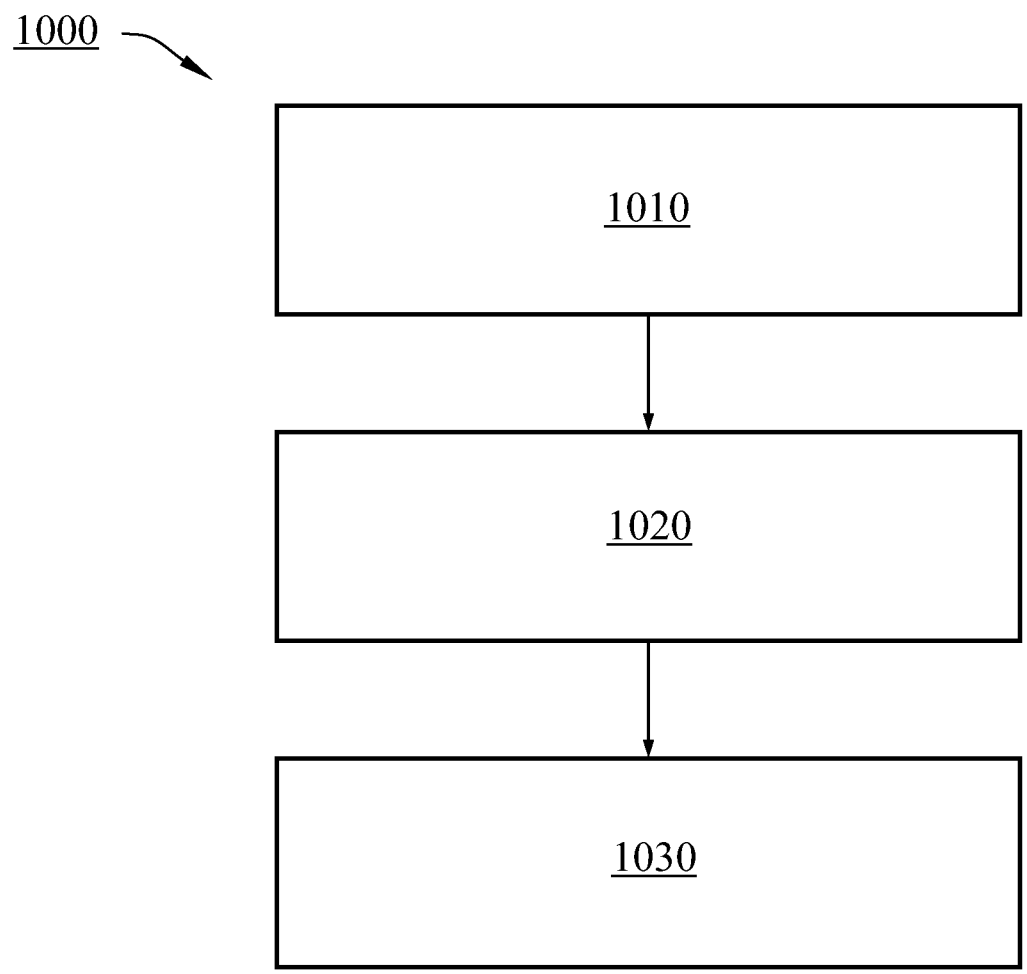
FIG. 11 is a flow chart showing blocks of the method for operation of a wind turbine, which switches off when a predetermined light intensity condition is exceeded in order to prevent shadow flicker at the immission points according to embodiments herein.

Further, according to embodiments described herein, a method for operation of a wind turbine, which changes the operational state of the wind turbine when a predetermined light intensity difference is exceeded in order to prevent shadow flicker at the immission points is provided (see FIG. 11). Changing the operational state of the wind turbine may, for instance, include shutting off the wind turbine or slowing down the tip speed of the rotor blades. According to embodiments herein, changing the operational state of the wind turbine may generally include any one or more of the following: decreasing the rotational speed of the blade(s)/rotor, and yawing the machine head and/or rotor to a different location which may assist in mitigating the adverse shadow impact of the wind turbine on neighboring residence, property or animals. Generally, the method described below is executed during predetermined times in relation to the position of the sun, at which a shadow-casting effect at the immission point (e.g. the residential area) is possible.

Usually, a wind turbine, which includes a light intensity detection system with a single light sensor, is provided. The method for operation of a wind turbine 1000 includes measuring with the single light sensor a first intensity of light from a first direction at a first time 1010. The first direction may, for instance, be determined based on the position of the sun. The method further includes measuring with the single light sensor a second intensity of light from a second direction at a second time 1020. The second direction may, for instance, be opposite to the first direction. Furthermore, the method includes changing the operational state of the wind turbine based on the obtained measurements when a predetermined light intensity condition is exceeded 1030.

According to embodiments herein, the method may further include changing the operational state of the wind turbine, e.g., shutting down the wind turbine based on the obtained measurements. The minimum and maximum light intensity measurements may be determined and the maximum difference between the minimum and maximum light intensity, i.e., the maximum difference in brightness between light from a first direction and light from a second direction may be computed and the operational state of the wind turbine is changed, e.g., the wind turbine is shut down if the difference exceeds a predetermined value. According to embodiments herein, the light from a first direction may be in a direction towards where the shadow of the rotor may be cast and the light from a second direction may be, for example, towards an opposite direction thereof (i.e. in a direction towards the sun).

If, for the current level of light intensity, a value above the shut-down light intensity is ascertained and if at the same time there is identity with the time of the day, i.e., solar irradiation or the position of the sun, the wind turbine may automatically stop.

The value of the predetermined shut-down light intensity can be altered by suitable inputs. As the shadow of the rotor blades of the wind turbine may become weaker with increasing distance in relation to the immission point and at some point becomes totally insignificant, the shadow-casting effect becomes detrimental, with increasing distance, only if a higher level of light intensity is involved. The shut-down light intensity, however, has to be adjusted in accordance with respective local factors because the level of shut-down light intensity also depends on the geographical factors on site.

The light conditions may be continuously measured after the wind turbine has been shut down. The wind turbine may re-start automatically if the level of light intensity is below the predetermined shut-down level for a duration of more than 2 minutes, preferably 10 minutes, or if the shadow has moved (by virtue of a change in the position of the sun or because of the path of movement of the sun) to such an extent that the immission point is no longer suffering from adverse effects due to a shadow being cast.

According to embodiments herein, the light detection system may exit from normal operation during the night, for example between 19:00 p.m. and 06:00 a.m. Or the system may only be put into operation during sunrise and/or sunset periods. The light detection system may be turned off during some specific seasons (e.g. the summer) or during certain specific months of the year. All these operational states may be achieved with control software.

The light intensity detection system according to embodiments described herein may be controlled manually, for instance, during turbine maintenance or service during daytime hours. The operator may be able to stop or deactivate the light intensity detection system accordingly.

Not limited to a particular embodiment described herein, measuring the first intensity of light and measuring the second intensity of light may include moving or rotating from a first position to a second position one or more elements chosen from the following list: the single light sensor, the housing and the cover. According to embodiments herein, the first position may be in a direction towards where the shadow of the rotor may be cast and the second position may be, for example, towards an opposite direction thereof (i.e. in a direction towards the sun).

According to yet further embodiments described herein, measuring the first intensity of light and measuring the second intensity of light may include continuously rotating one or more elements chosen from the following list: the single light sensor, the housing and the cover.

The above-described systems and methods facilitate a cost-efficient and reliable wind turbine shadow flicker protection system, including a single light sensor that allows a controlled reduction of the tip speed of the blades of a wind turbine or the shut-down of the wind turbine when the difference between the light intensity value of light from a first direction and light from a second direction is greater than a predetermined value. This single light sensor may enable a simplified and more cost efficient design of the wind turbine shadow flicker protection system.

Exemplary embodiments of systems and methods for preventing the shadow flicker effect of wind turbines are described above in detail. The systems and methods are not limited to the specific embodiments described herein, but rather, components of the systems and/or steps of the methods may be utilized independently and separately from other components and/or steps described herein. For example, the light intensity detection system is not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A light intensity detection system for a wind turbine, comprising:
   a) a single light sensor adapted to measure the intensity of light;
   b) a housing for protecting the single light sensor from environmental influences; and,
   c) a driving mechanism configured to allow the single light sensor to receive light from a first direction at a first time and from a second direction at a second time.

2. The light intensity detection system according to claim 1, wherein the first time and the second time are distinct from each other.

3. The light intensity detection system according to claim 1, wherein the housing comprises a first window adapted to allow light from at least one of the first direction and the second direction into the housing.

4. The light intensity detection system according to claim 1, wherein the housing comprises at least a first window adapted to allow light from the first direction into the housing and a second window adapted to allow light from the second direction into the housing.

5. The light intensity detection system according to claim 1, wherein at least one of the single light sensor and the housing are moveable from a first position to a second position, and wherein in the first position the single light sensor receives light from the first direction and in the second position the single light sensor receives light from the second direction.

6. The light intensity detection system according to claim 1, wherein at least one of the single light sensor is moveable with respect to the housing and the housing is moveable with respect to the single light sensor from a first position to a second position, and wherein in the first position the single light sensor receives light from the first direction and in the second position the single light sensor receives light from the second direction.

7. The light intensity detection system according to claim 1, further comprising a mirror system adapted to reflect light entering the housing from the first direction and from the second direction onto the single light sensor.

8. The light intensity detection system according to claim 7, wherein the mirror system is at least one element chosen from the following list: a curved mirror, a conical mirror and a flat mirror.

9. The light intensity detection system according to claim 3, wherein the housing comprises a shutter device adapted to be moveable between an open and a closed position, whereby in the closed position the shutter device covers at least a portion of the first window thereby preventing light from at least one of the first direction and second direction to enter into the housing.

10. The light intensity detection system according to claim 3, wherein the housing comprises a rotatable cover, which is moveable with respect to the housing from a first position to a second position, and wherein in the first position the single light sensor receives light from the first direction and in the second position the single light sensor receives light from the second direction.

11. The light intensity detection system according to claim 10, wherein the first window is integrated in the rotatable cover.

12. A wind turbine, comprising:
   a) a nacelle supported by a tower;
   b) at least one rotor blade to capture wind energy;
   c) a light intensity detection system including a single light sensor adapted to measure the intensity of light; a housing for protecting the single light sensor from environmental influences; and a driving mechanism configured to allow the single light sensor to receive light from a first direction at a first time and from a second direction at a second time, respectively; and
   d) a control system for operating the wind turbine, wherein the control system is operatively connected with the light intensity detection system.

13. The wind turbine according to claim 12, further comprising a guiding device arranged around the tower of the wind turbine such that the light intensity detection system may be displaced along the guiding device from a first position to a second position.

14. The wind turbine according to claim 13, wherein the guiding device includes a first rail system attached around the tower wall in a horizontal orientation, and wherein the driving mechanism is adapted to displace the light intensity detection system along the first rail system.

15. The wind turbine according to claim 13, wherein the guiding device includes a second rail system attached to the tower wall in a vertical orientation, and wherein the driving mechanism is adapted to displace the light intensity detection system in a vertical direction up or down the tower of the wind turbine.

16. The wind turbine according to claim 15, wherein the driving mechanism is an electric motor.

17. A method for operation of a wind turbine, the wind turbine comprises a light intensity detection system including a single light sensor, said method comprising:
   a) measuring with the single light sensor a first intensity of light from a first direction at a first time;
   b) measuring with the single light sensor a second intensity of light from a second direction at a second time; and
   c) changing the operational state of the wind turbine based on the obtained measurements when a predetermined light intensity condition is exceeded.

18. The method according to claim 17, wherein changing the operational state of the wind turbine based on the obtained measurements includes calculating the difference between the first and the second light intensities and shutting down the wind turbine if the difference exceeds a predetermined value.

19. The method according to claim 17, wherein measuring the first intensity of light and measuring the second intensity of light includes rotating from a first position to a second position one or more elements chosen from the following list: the single light sensor, the housing and the cover.

20. The method according to claim 17, wherein measuring the first intensity of light and measuring the second intensity of light includes continuously rotating one or more elements chosen from the following list: the single light sensor, the housing and the cover.

* * * * *